US012808969B2

(12) United States Patent
Yoshioka et al.

(10) Patent No.: US 12,808,969 B2
(45) Date of Patent: Nov. 24, 2026

(54) RADIO WAVE ARRIVAL DIRECTION ESTIMATION DEVICE AND RADIO WAVE ARRIVAL DIRECTION ESTIMATION METHOD

(71) Applicant: NTT, Inc., Tokyo (JP)

(72) Inventors: Masafumi Yoshioka, Musashino (JP); Fumiaki Nagase, Musashino (JP); Keita Kuriyama, Musashino (JP); Toshifumi Miyagi, Musashino (JP)

(73) Assignee: NTT, Inc., Tokyo (JP)

(*) Notice: Subject to any disclaimer, the term of this patent is extended or adjusted under 35 U.S.C. 154(b) by 177 days.

(21) Appl. No.: 18/839,456

(22) PCT Filed: Feb. 24, 2022

(86) PCT No.: PCT/JP2022/007704
§ 371 (c)(1),
(2) Date: Aug. 19, 2024

(87) PCT Pub. No.: WO2023/162104
PCT Pub. Date: Aug. 31, 2023

(65) Prior Publication Data

US 2025/0155538 A1 May 15, 2025

(51) Int. Cl.
*G01S 3/28* (2006.01)
*G01S 3/04* (2006.01)

(52) U.S. Cl.
CPC ................ *G01S 3/28* (2013.01); *G01S 3/043* (2013.01)

(58) Field of Classification Search
CPC .. G01S 3/28; G01S 3/043; G01S 3/46; H01Q 17/001

(Continued)

(56) References Cited

U.S. PATENT DOCUMENTS 4,756,917 A * 7/1988 Kamada .................... B32B 7/06 428/457
4,767,673 A * 8/1988 Nakano ................... B32B 15/08 428/209

(Continued)

FOREIGN PATENT DOCUMENTS

EP 1657875 A1 * 5/2006 ........... H04L 1/1671
EP 3254133 B1 * 7/2020 ............. G01S 3/043

(Continued)

OTHER PUBLICATIONS

Minseok Kim, "Torai hoko suitei shisutemu no kiso to jissorei (in Japanese), (Basics and Implementation Examples of Direction of Arrival Estimation System)", Design Wave Magazine, Dec. 2007, 8 pages. (Cited in the Specification).

*Primary Examiner* — Nuzhat Pervin
(74) *Attorney, Agent, or Firm* — XSENSUS LLP

(57) ABSTRACT

A radio wave arrival direction estimation device according to one embodiment includes: a radio wave absorber extending vertically; a plurality of omnidirectional antennas arranged around the radio wave absorber so as to extend in the same direction as the radio wave absorber; a measuring unit configured to measure a received power or a C/N value of a radio wave received by the plurality of omnidirectional antennas; an estimation unit configured to estimate a radio wave arrival direction based on either of the received power or the C/N value measured by the measuring unit; and an output unit configured to output information indicating the radio wave arrival direction estimated by the estimation unit.

4 Claims, 5 Drawing Sheets

(58) Field of Classification Search
USPC .......................................................... 342/417
See application file for complete search history.

(56) References Cited

U.S. PATENT DOCUMENTS

| | | | | | |
|---|---|---|---|---|---|
| 4,771,937 | A * | 9/1988 | Kamada | B65D 77/206 | 229/123.1 |
| 4,848,931 | A * | 7/1989 | Kamada | B32B 15/08 | 383/111 |
| 5,221,340 | A * | 6/1993 | Nagase | C08J 3/226 | 523/102 |
| 5,435,825 | A * | 7/1995 | Kusui | C22C 32/0063 | 75/355 |
| 6,163,861 | A * | 12/2000 | Yoshioka | H04L 1/1809 | 714/712 |
| 9,918,198 | B2 * | 3/2018 | Moshfeghi | G01S 5/0226 | |
| 10,794,984 | B2 * | 10/2020 | Rappaport | G01S 3/48 | |
| 11,194,005 | B2 * | 12/2021 | Reisenfeld | G01S 3/8003 | |
| 11,991,734 | B2 * | 5/2024 | Wigren | H04W 72/044 | |
| 2019/0310341 | A1 * | 10/2019 | Wang | G01S 3/74 | |
| 2021/0051051 | A1 * | 2/2021 | Kuriyama | H04B 7/0456 | |
| 2021/0156947 | A1 * | 5/2021 | Takizawa | G01S 3/74 | |
| 2021/0273705 | A1 * | 9/2021 | Fukuzono | H04W 16/28 | |
| 2021/0359727 | A1 * | 11/2021 | Kuriyama | H04B 7/0617 | |
| 2022/0128611 | A1 * | 4/2022 | Almog | G01S 3/14 | |
| 2022/0140866 | A1 * | 5/2022 | Kuriyama | H04B 7/005 | 375/231 |
| 2022/0149898 | A1 * | 5/2022 | Kuriyama | H04B 1/04 | |
| 2022/0200830 | A1 * | 6/2022 | Fukuzono | H04B 3/10 | |
| 2022/0209830 | A1 * | 6/2022 | Kuriyama | H04B 3/04 | |
| 2022/0216900 | A1 * | 7/2022 | Kuriyama | H04B 7/06 | |
| 2022/0278721 | A1 * | 9/2022 | Fukuzono | H04B 7/0413 | |
| 2022/0294506 | A1 * | 9/2022 | Kuriyama | H04B 7/0413 | |
| 2022/0302974 | A1 * | 9/2022 | Kuriyama | H04B 17/336 | |
| 2022/0321392 | A1 * | 10/2022 | Fukuzono | H04W 28/18 | |
| 2023/0055133 | A1 * | 2/2023 | Fukuzono | H04B 7/0413 | |
| 2023/0070849 | A1 * | 3/2023 | Fukuzono | H04B 7/0413 | |
| 2023/0106272 | A1 * | 4/2023 | Kuriyama | H04B 7/0617 | 375/267 |
| 2023/0217281 | A1 * | 7/2023 | Miyagi | H04B 17/345 | 370/252 |
| 2023/0217392 | A1 * | 7/2023 | Kuriyama | H04L 5/14 | 370/280 |
| 2023/0239013 | A1 * | 7/2023 | Kuriyama | H04B 7/0456 | 375/267 |
| 2023/0239905 | A1 * | 7/2023 | Kuriyama | H04W 72/0446 | 370/280 |
| 2023/0275839 | A1 * | 8/2023 | Nagase | H04L 47/24 | |
| 2023/0318632 | A1 * | 10/2023 | Miyagi | H04B 1/0003 | 455/418 |
| 2023/0370380 | A1 * | 11/2023 | Nagase | H04W 28/0289 | |
| 2023/0412453 | A1 * | 12/2023 | Hasegawa | H04B 17/17 | |
| 2023/0421210 | A1 * | 12/2023 | Fukuzono | H04B 7/0413 | |
| 2024/0007212 | A1 * | 1/2024 | Osaka | H04J 1/08 | |
| 2024/0031872 | A1 * | 1/2024 | Yoshioka | H04W 52/26 | |
| 2024/0048500 | A1 * | 2/2024 | Nagase | H04L 43/0882 | |
| 2024/0063850 | A1 * | 2/2024 | Fukuzono | H04B 7/024 | |
| 2024/0072847 | A1 * | 2/2024 | Fukuzono | H04B 7/022 | |
| 2024/0072876 | A1 * | 2/2024 | Kuriyama | H04B 7/0413 | |
| 2024/0080066 | A1 * | 3/2024 | Kuriyama | H04L 25/0224 | |
| 2024/0168147 | A1 * | 5/2024 | McLaughlin | G01S 5/06 | |
| 2024/0275649 | A1 * | 8/2024 | Fukuzono | H04B 1/123 | |
| 2024/0288529 | A1 * | 8/2024 | Yoshioka | G01S 3/20 | |
| 2024/0305338 | A1 * | 9/2024 | Kuriyama | H04B 7/0417 | |
| 2024/0314639 | A1 * | 9/2024 | Hasegawa | H04W 28/18 | |
| 2024/0333347 | A1 * | 10/2024 | Kuriyama | H04B 7/0413 | |
| 2024/0348488 | A1 * | 10/2024 | Fukuzono | H04L 27/36 | |
| 2024/0349322 | A1 * | 10/2024 | Kuriyama | H04W 36/06 | |
| 2024/0356787 | A1 * | 10/2024 | Kuriyama | H04B 1/0475 | |
| 2024/0380502 | A1 * | 11/2024 | Kuriyama | H04B 17/346 | |
| 2024/0396623 | A1 * | 11/2024 | Ono | H04W 88/02 | |
| 2024/0405847 | A1 * | 12/2024 | Ono | H04W 16/26 | |
| 2024/0406051 | A1 * | 12/2024 | Fukuzono | H04L 27/26 | |
| 2025/0007601 | A1 * | 1/2025 | Ono | H04B 7/15528 | |
| 2025/0097851 | A1 * | 3/2025 | Fukuzono | H04L 27/20 | |
| 2025/0112810 | A1 * | 4/2025 | Kuriyama | H04L 27/2621 | |
| 2025/0112811 | A1 * | 4/2025 | Kuriyama | H04L 27/2621 | |
| 2025/0158697 | A1 * | 5/2025 | Osaka | H04B 7/12 | |

FOREIGN PATENT DOCUMENTS

| | | | | |
|---|---|---|---|---|
| JP | 2008233017 | A * | 10/2008 | G01S 3/46 |
| JP | 2017040590 | A * | 2/2017 | G01S 11/08 |
| JP | 2017204677 | A * | 11/2017 | H04J 99/00 |

* cited by examiner

RADIO WAVE ARRIVAL DIRECTION ESTIMATION DEVICE AND RADIO WAVE ARRIVAL DIRECTION ESTIMATION METHOD

CROSS-REFERENCE TO RELATED APPLICATION

The present application is based on PCT filing PCT/JP2022/007704, filed Feb. 24, 2022, the entire contents of which are incorporated herein by reference.

TECHNICAL FIELD

The present invention relates to a radio wave arrival direction estimation device and a radio wave arrival direction estimation method.

BACKGROUND ART

Several methods for estimating a direction-of-arrival of a radio wave in wireless communication have been proposed. For example, methods using a phase difference of a radio wave based on a difference in antenna positions and multiple signal classification (MUSIC) are promising; additionally, proposed is a method of enabling estimation of a direction-of-arrival of a radio wave on a horizontal plane by changing a direction of a main lobe or a null point of an antenna pattern (see, for example, Non Patent Literature 1).

In the related art, it is not assumed that a radio wave can arrive from any of three-directional directions, and a direction-of-arrival of the radio wave is estimated based on a correlation matrix obtained using an array antenna. That is, only planar arrival directions can be estimated.

CITATION LIST

Non Patent Literature

Non Patent Literature 1: Minseok Kim, "Torai hoko suitei system no kiso to jisso-rei (in Japanese) [Basics and Implementation of Direction-of-Arrival Estimation System]", Design Wave Magazine, 2007 December, pp. 112-118.

SUMMARY OF INVENTION

Technical Problem

However, a plurality of antenna elements and an antenna with high directivity are required for the related art, and further, accuracy is not improved in a low frequency band.

A large antenna element and enlarged array antenna are required for a low frequency band such as the VHF band, so that it may be difficult to install the antenna element.

The present invention has been made to address the problems above, and an object thereof is to provide a radio wave arrival direction estimation device and a radio wave arrival direction estimation method, each capable of estimating a radio wave arrival direction with a simple configuration without using an antenna with high directivity.

Solution to Problem

Provided is a radio wave arrival direction estimation device according to one embodiment of the present invention, the device including: a radio wave absorber extending vertically; a plurality of omnidirectional antennas arranged around the radio wave absorber so as to extend in the same direction as the radio wave absorber; a measuring unit configured to measure a received power or a C/N value of a radio wave received by the plurality of omnidirectional antennas; an estimation unit configured to estimate a radio wave arrival direction based on either of the received power or the C/N value measured by the measuring unit; and an output unit configured to output information indicating the radio wave arrival direction estimated by the estimation unit.

A radio wave arrival direction estimation method according to one embodiment of the present invention is a method for estimating a radio wave arrival direction using a radio wave absorber extending vertically and a plurality of omnidirectional antennas arranged around the radio wave absorber so as to extend in the same direction as the radio wave absorber, the method including:

a measuring step of measuring a received power or a C/N value of a radio wave received by the plurality of omnidirectional antennas;

an estimation step of estimating a radio wave arrival direction based on either of the received power or the C/N value measured; and an output step of outputting information indicating the radio wave arrival direction estimated.

Advantageous Effects of Invention

According to the present invention, it is possible to estimate a radio wave arrival direction with a simple configuration without using an antenna with high directivity.

BRIEF DESCRIPTION OF DRAWINGS

FIG. 2(*b*) is a perspective view of the antenna unit.

DESCRIPTION OF EMBODIMENTS

Figure 1:
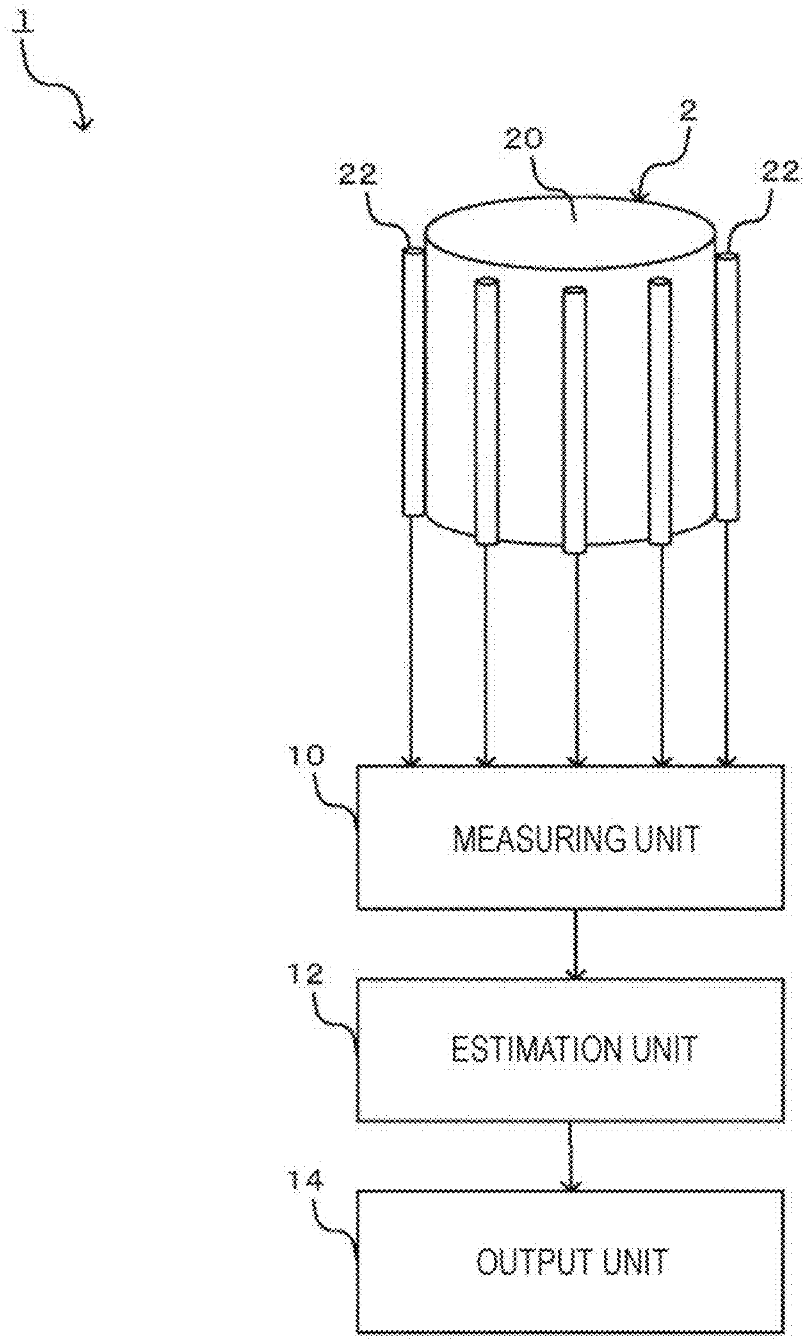
FIG. 1 is a diagram illustrating a configuration example of a radio wave arrival direction estimation device according to one embodiment.

Hereinafter, a configuration example of a radio wave arrival direction estimation device 1 according to one embodiment will be described with reference to the drawings. FIG. 1 is a diagram illustrating a configuration example of the arrival direction estimation device 1 according to one embodiment.

As illustrated in FIG. 1, the arrival direction estimation device 1 according to one embodiment includes, for example, an antenna unit 2, a measuring unit 10, an estimation unit 12, and an output unit 14.

The antenna unit 2 includes a radio wave absorber 20 extending vertically and a plurality of omnidirectional antennas 22 arranged around the radio wave absorber 20 so as to extend in the same direction as the radio wave absorber 20, and outputs a received power of a radio wave received by the plurality of omnidirectional antennas 22 to the measuring unit 10. The omnidirectional antenna 22 is, for example, a whip antenna that is omnidirectional in the horizontal direction.

For example, the plurality of omnidirectional antennas 22 are arranged at equal intervals on a circumference centered on an axis extending vertically through the center of the radio wave absorber 20.

The measuring unit 10 measures a received power or a C/N value of the radio wave received by the plurality of omnidirectional antennas 22, and outputs the received power or the C/N value to the estimation unit 12.

The estimation unit 12 estimates an arrival direction of the radio wave on the basis of the received power or the C/N value measured by the measuring unit 10, and outputs information indicating the estimated arrival direction to the output unit 14.

The output unit 14 outputs the information indicating the radio wave arrival direction estimated by the estimation unit 12 by, for example, displaying the information.

Figure 2:
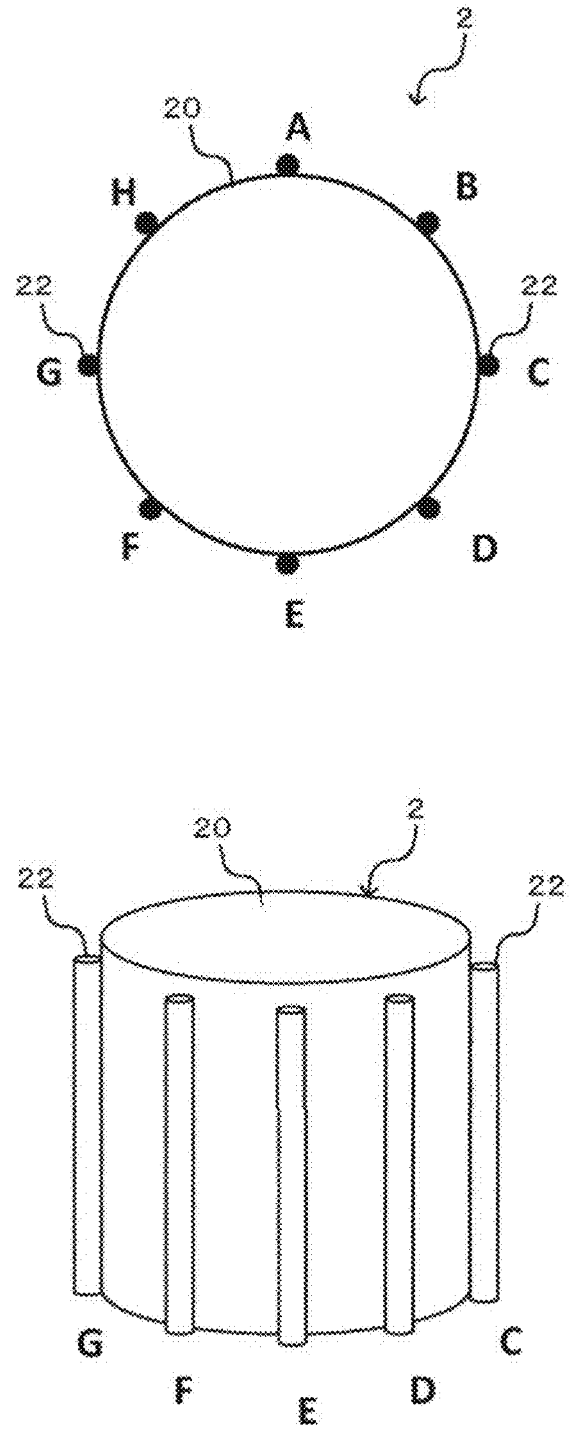
FIG. 2(*a*) is a diagram of an antenna unit as viewed from above.

The antenna unit 2 will be described in more detail. FIG. 2 is a diagram illustrating a specific example of a configuration of the antenna unit 2. FIG. 2(*a*) is a diagram of the antenna unit 2 as viewed from above. FIG. 2(*b*) is a perspective view of the antenna unit 2.

As illustrated in FIG. 2, the plurality of omnidirectional antennas 22 are attached around the radio wave absorber 20 in the antenna unit 2. Here, eight omnidirectional antennas 22A to 22H are arranged at 45° intervals around the radio wave absorber 20. As the number of omnidirectional antennas 22 becomes larger, the higher the accuracy of estimation of the radio wave arrival direction by the arrival direction estimation device 1 is.

Figure 3:
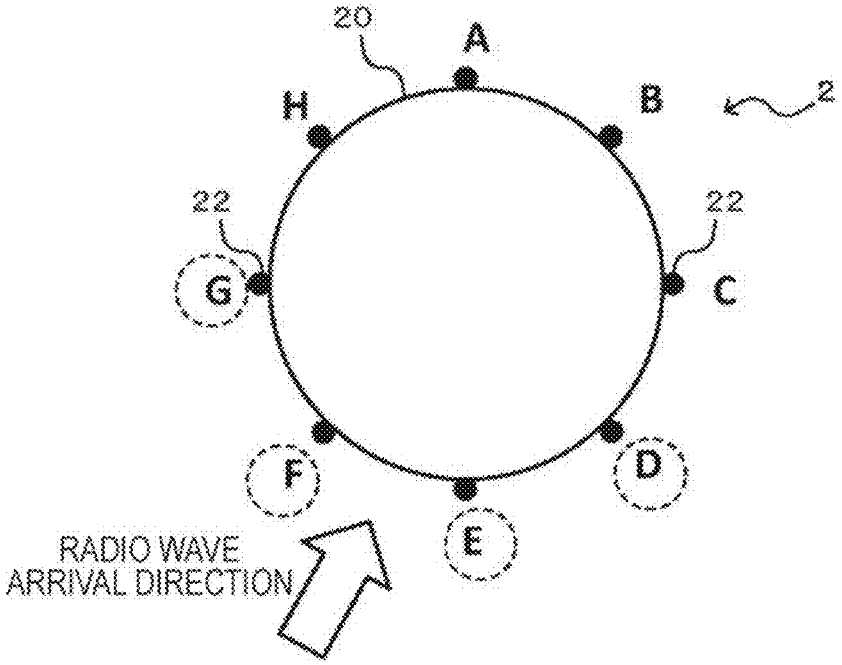
FIG. 3 is a diagram illustrating a radio wave arrival direction to the antenna unit.

FIG. 3 is a diagram illustrating the radio wave arrival direction with respect to the antenna unit 2. As illustrated in FIG. 3, for example, it is assumed that radio waves arrive between the omnidirectional antennas 22F and 22E.

At this time, the omnidirectional antennas 22D, 22E, 22F, and 22G receive the radio waves at a high level. Therefore, the estimation unit 12 can estimate the radio wave arrival direction on the basis of a magnitude of the received power of the radio waves received by the omnidirectional antennas 22D, 22E, 22F, and 22G.

In a case where the radio wave arrives from the direction of the omnidirectional antenna 22F, the high level radio waves are received by the omnidirectional antennas 22D, 22E, 22F, 22G, and 22H with the largest received power at the omnidirectional antenna 22F. Therefore, the omnidirectional antenna 22 can estimate that the radio waves arrive from the direction of the omnidirectional antenna 22F.

Figure 4:
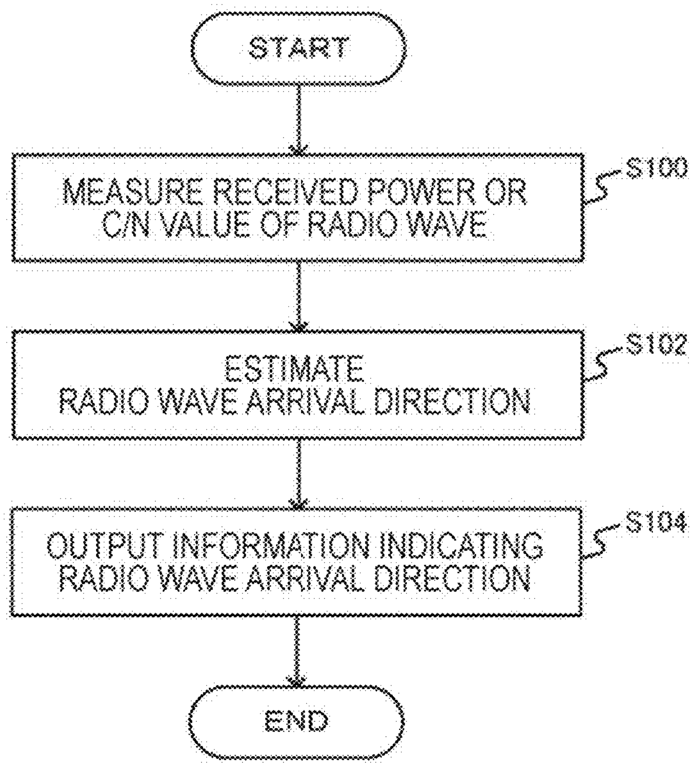
FIG. 4 is a flowchart illustrating operations of the arrival direction estimation device.

FIG. 4 is a flowchart illustrating operations of the arrival direction estimation device 1. As illustrated in FIG. 4, the measuring unit 10 in the arrival direction estimation device 1 measures the received power or the C/N value of the radio wave in step 100 (S100).

In step 102 (S102), the estimation unit 12 estimates the radio wave arrival direction.

In step 104 (S104), the output unit 14 displays and outputs information indicating the radio wave arrival direction.

Figure 5:
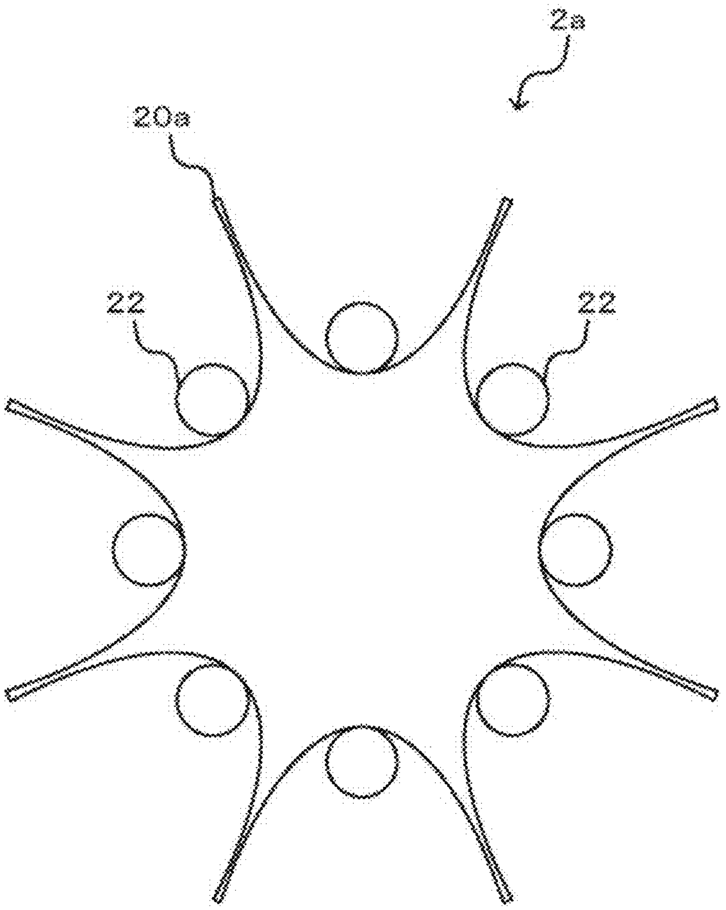
FIG. 5 is a diagram illustrating a modified example of the antenna unit.

FIG. 5 is a diagram illustrating a modified example (antenna unit 2*a*) of the antenna unit 2. As illustrated in FIG. 5, a plurality of omnidirectional antennas 22 may be arranged at positions where side surfaces of a cylindrical radio wave absorber are recessed in the antenna unit 2*a*.

As described above, in the arrival direction estimation device 1, the antenna unit 2 includes the radio wave absorber 20 extending vertically and the plurality of omnidirectional antennas 22 arranged around the radio wave absorber 20 so as to extend in the same direction as the radio wave absorber 20. Therefore, the radio wave arrival direction can be estimated with a simple configuration but without an antenna having high directivity.

REFERENCE SIGNS LIST

1 Arrival direction estimation device
2, 2*a* Antenna unit
10 Measuring unit
12 Estimation unit
14 Output unit
20, 20*a* Radio wave absorber
22 Omnidirectional antenna

The invention claimed is:

1. A radio wave arrival direction estimation device, comprising:
- a radio wave absorber which is cylindrical and extends along a first direction, wherein the radio wave absorber includes side surfaces which are recessed;
- a plurality of omnidirectional antennas arranged around the radio wave absorber so as to extend in the first direction, the plurality of omnidirectional antennas being arranged at positions where the side surfaces of the radio wave absorber are recessed;
- measuring circuitry configured to measure a received power or a C/N value of a radio wave received by the plurality of omnidirectional antennas;
- estimation circuitry configured to estimate a radio wave arrival direction based on either of the received power or the C/N value measured by the measuring circuitry; and
- output circuitry configured to output information indicating the radio wave arrival direction estimated by the estimation circuitry.

2. The radio wave arrival direction estimation device according to claim 1, wherein the plurality of omnidirectional antennas are arranged at equal intervals on a circumference centered on an axis extending along the first direction through the center of the radio wave absorber.

3. A radio wave arrival direction estimation method for estimating a radio wave arrival direction using a radio wave absorber and a plurality of omnidirectional antennas arranged around the radio wave absorber so as to extend in the first direction, wherein the radio wave absorber is cylindrical and extends along a first direction, the radio wave absorber includes side surfaces which are recessed, and the plurality of omnidirectional antennas are arranged at positions where the side surfaces of the radio wave absorber are recessed, the radio wave arrival direction estimation method comprising:
- measuring a received power or a C/N value of a radio wave received by the plurality of omnidirectional antennas;
- estimating a radio wave arrival direction based on either of the received power or the C/N value measured; and
- outputting information indicating the radio wave arrival direction estimated.

4. The radio wave arrival direction estimation method according to claim 3, wherein the plurality of omnidirectional antennas are arranged at equal intervals on a circumference centered on an axis extending along the first direction through the center of the radio wave absorber.

* * * * *